(12) United States Patent
Wermuth et al.

(10) Patent No.: US 8,955,492 B2
(45) Date of Patent: Feb. 17, 2015

(54) CONTROL STRATEGY FOR TRANSITIONS BETWEEN HOMOGENEOUS-CHARGE COMPRESSION-IGNITION AND SPARK-IGNITION COMBUSTION MODES

(75) Inventors: Nicole Wermuth, Garching Bei München (DE); Paul M. Najt, Bloomfield Hills, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 711 days.

(21) Appl. No.: 13/098,630

(22) Filed: May 2, 2011

(65) Prior Publication Data

US 2011/0283972 A1 Nov. 24, 2011

Related U.S. Application Data

(60) Provisional application No. 61/347,507, filed on May 24, 2010.

(51) Int. Cl.
*F02B 5/00* (2006.01)
*F02D 41/00* (2006.01)
(Continued)

(52) U.S. Cl.
CPC .......... *F02D 41/0002* (2013.01); *F02B 17/005* (2013.01); *F02D 13/0226* (2013.01); *F02D 37/02* (2013.01); *F02D 41/0057* (2013.01); *F02D 41/3029* (2013.01); *F02D 41/3035* (2013.01); *F02D 41/307* (2013.01);
(Continued)

(58) Field of Classification Search
CPC ............ F02D 41/3011; F02D 41/3017; F02D 41/3023; F02D 41/3029; F02D 41/3064; F02D 41/307; F02D 41/3076

USPC ............... 701/103, 104; 123/90.15, 295, 305, 123/430, 406.19, 406.23, 406.26, 406.47
See application file for complete search history.

(56) References Cited

U.S. PATENT DOCUMENTS

| 6,336,436 | B1 * | 1/2002 | Miyakubo et al. ............ 123/295 |
| 6,910,449 | B2 * | 6/2005 | Strom et al. ................ 123/90.16 |
| 6,953,409 | B2 | 10/2005 | Schmidt et al. |
| 6,994,072 | B2 | 2/2006 | Kuo et al. |
| 7,128,047 | B2 | 10/2006 | Kuo et al. |
| 7,152,559 | B2 | 12/2006 | Kuo et al. |

(Continued)

*Primary Examiner* — Stephen K Cronin
*Assistant Examiner* — Anthony L Bacon

(57) ABSTRACT

A direct-injection internal combustion engine includes an intake camshaft with a low-lift intake cam and a high-lift intake cam, a variable lift control for selectively operating an intake valve in one of a low-lift intake valve profile with the low-lift intake cam and a high-lift intake valve profile with the high-lift intake cam, a variable cam phase control operative on the intake camshaft for simultaneously controlling the phase of the low-lift intake cam and the high-lift intake cam, an ignition spark control, a fuel injection control, an exhaust gas recirculation control, and an intake throttle control. A method of operating the engine includes operating the engine in one of a) a homogeneous-charge compression-ignition (HCCI) combustion mode including the low-lift intake valve profile, and b) a spark ignition (SI) combustion mode including the high-lift intake valve profile, and within a predetermined range of engine loads and camshaft phasings, wherein the low-lift intake valve profile and the high-lift intake valve profile effect a respective intake airflow in the corresponding HCCI combustion mode and SI combustion mode conducive to stable combustion exclusively through fuel and spark control. The method further includes transitioning between the HCCI and SI combustion modes exclusively through adjustments to the variable lift control, the ignition spark control, and the fuel injection control.

12 Claims, 3 Drawing Sheets

(51) Int. Cl.
*F02B 17/00* (2006.01)
*F02D 13/02* (2006.01)
*F02D 37/02* (2006.01)
*F02D 41/30* (2006.01)
*F02D 41/40* (2006.01)

(52) U.S. Cl.
CPC ......... *F02D41/401* (2013.01); *F02D 2041/001* (2013.01); *F02D 2041/002* (2013.01); *Y02T 10/12* (2013.01); *Y02T 10/128* (2013.01); *Y02T 10/18* (2013.01); *Y02T 10/42* (2013.01); *Y02T 10/47* (2013.01)
USPC ....................... 123/305; 123/406.47; 701/103

(56) References Cited

U.S. PATENT DOCUMENTS

| | | | |
|---|---|---|---|
| 7,213,566 B1 * | 5/2007 | Jankovic et al. | 123/302 |
| 7,275,514 B2 | 10/2007 | Kuo et al. | |
| 7,370,616 B2 | 5/2008 | Kuo et al. | |
| 8,417,437 B2 * | 4/2013 | Yamashita et al. | 701/105 |
| 2004/0149255 A1 * | 8/2004 | zur Loye et al. | 123/295 |
| 2006/0016438 A1 | 1/2006 | Kang | |
| 2006/0150952 A1 * | 7/2006 | Yang et al. | 123/432 |
| 2006/0196466 A1 * | 9/2006 | Kuo et al. | 123/295 |
| 2007/0205029 A1 * | 9/2007 | Leone et al. | 180/65.2 |
| 2008/0035125 A1 * | 2/2008 | Jankovic | 123/556 |
| 2008/0066713 A1 * | 3/2008 | Megli et al. | 123/295 |
| 2008/0271688 A1 * | 11/2008 | Wermuth et al. | 123/90.16 |

* cited by examiner

CONTROL STRATEGY FOR TRANSITIONS BETWEEN HOMOGENEOUS-CHARGE COMPRESSION-IGNITION AND SPARK-IGNITION COMBUSTION MODES

CROSS REFERENCE TO RELATED APPLICATIONS

This application claims the benefit of U.S. Provisional Application No. 61/347,507, filed on May 24, 2010, which is incorporated herein by reference.

TECHNICAL FIELD

This disclosure relates to an engine operable in two discrete combustion modes.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

In engine operation, the engine airflow is controlled by selectively adjusting position of the throttle valve and controlling opening and closing of intake valves and exhaust valves. On engine systems so equipped, opening and closing of the intake valves and exhaust valves may be adjusted using a variable valve actuation system that includes variable cam phasing and selectable multi-step valve lift, e.g., multiple-step cam lobes which provide two or more valve lift profiles. In contrast to the throttle position change which is continuous, the change in valve position of the multi-step valve lift mechanism is a discrete change.

When an engine operates in a HCCI combustion mode, the engine operates at a lean or stoichiometric air/fuel ratio operation with the throttle wide open to minimize engine pumping losses. When the engine operates in the SI combustion mode, the engine operates in stoichiometric air/fuel ratio, with the throttle valve controlled over a range of positions from 0% to 100% of the wide-open position to control intake airflow to achieve the stoichiometric air/fuel ratio.

In an engine configured to operate in SI and HCCI combustion modes, transitioning between combustion modes can be complex. The engine control module must coordinate actuations of multiple devices in order to provide a desired air/fuel ratio for the different modes. During a transition between a HCCI combustion mode and SI combustion mode, valve lift profile switching occurs nearly instantaneously, while adjustments to cam phasers and pressures in the manifold have slower dynamics. Until the desired air/fuel ratio is achieved, incomplete combustion and misfire can occur, leading to torque disturbances.

SUMMARY

A direct-injection internal combustion engine includes an intake camshaft with a low-lift intake cam and a high-lift intake cam, a variable lift control for selectively operating an intake valve in one of a low-lift intake valve profile with the low-lift intake cam and a high-lift intake valve profile with the high-lift intake cam, a variable cam phase control operative on the intake camshaft for simultaneously controlling the phase of the low-lift intake cam and the high-lift intake cam, an ignition spark control, a fuel injection control, an exhaust gas recirculation control, and an intake throttle control. A method of operating the engine includes operating the engine in one of a) a homogeneous-charge compression-ignition (HCCI) combustion mode including the low-lift intake valve profile, and b) a spark ignition (SI) combustion mode including the high-lift intake valve profile, and within a predetermined range of engine loads and camshaft phasings, wherein the low-lift intake valve profile and the high-lift intake valve profile effect a respective intake airflow in the corresponding HCCI combustion mode and SI combustion mode conducive to stable combustion exclusively through fuel and spark control. The method further includes transitioning between the HCCI and SI combustion modes exclusively through adjustments to the variable lift control, the ignition spark control, and the fuel injection control.

BRIEF DESCRIPTION OF THE DRAWINGS

One or more embodiments will now be described, by way of example, with reference to the accompanying drawings, in which.

DETAILED DESCRIPTION

Figure 1:
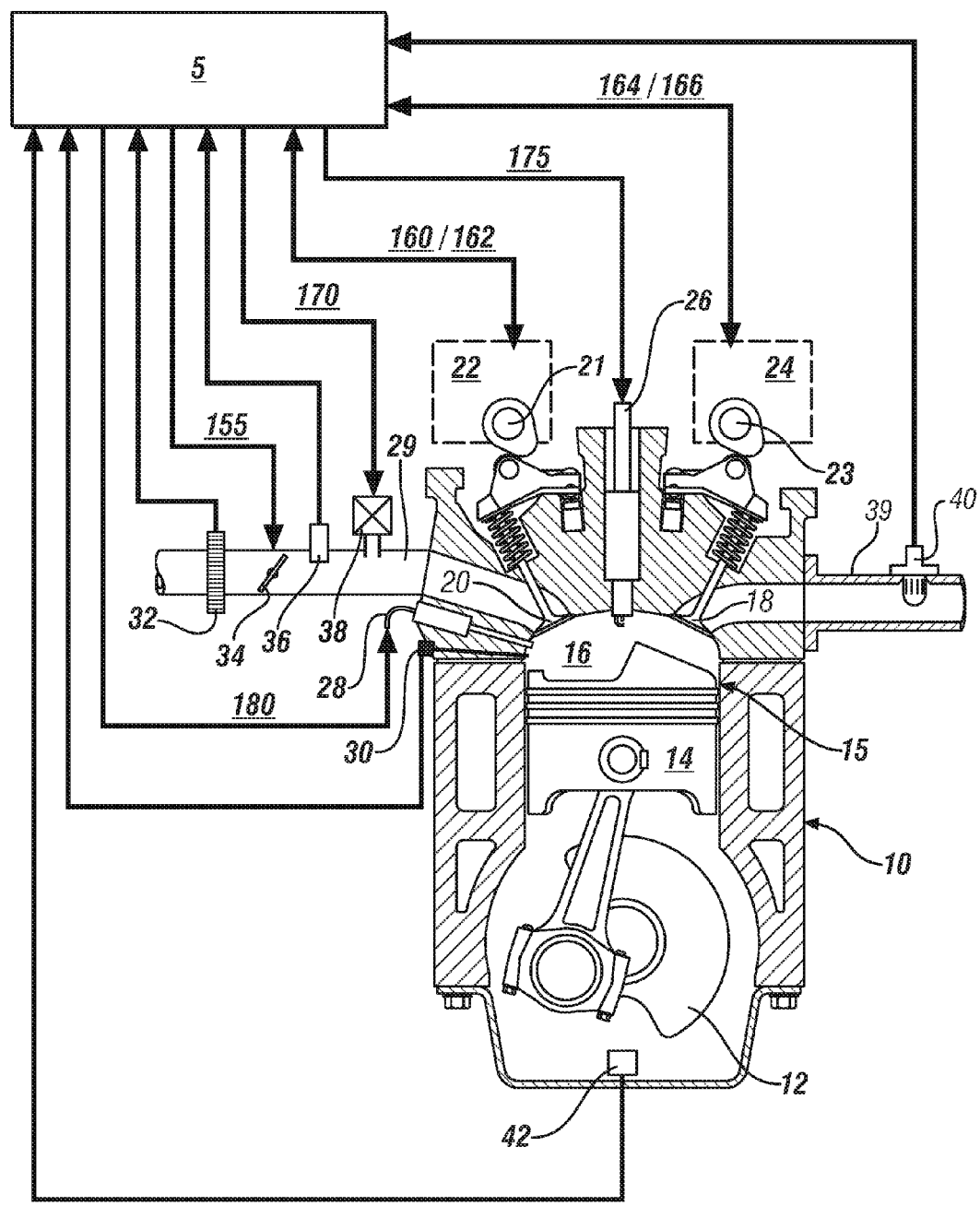
FIG. 1 is a schematic section view of an internal combustion engine and a schematic drawing of an accompanying control module, in accordance with the present disclosure.

Referring now to the drawings, wherein the depictions are for the purpose of illustrating certain exemplary embodiments only and not for the purpose of limiting the same, FIG. 1 is a section view of an internal combustion engine 10 and a schematic drawing of an accompanying control module 5 that have been constructed in accordance with an embodiment of this disclosure. The engine 10 is selectively operative in a plurality of combustion modes, including a HCCI combustion mode and a homogeneous spark-ignition (SI) combustion mode. The engine 10 is selectively operative at a stoichiometric air/fuel ratio and at an air/fuel ratio that is primarily lean of stoichiometry. The disclosure can be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow and intake air temperature. A throttle valve 34 preferably includes an electronically controlled device that is used to control airflow to the engine 10 in response to a control signal 155 from the control module 5. A pressure sensor 36 in the intake manifold 29 is configured to monitor manifold absolute pressure and barometric pressure. An external flow passage recirculates exhaust gases from an exhaust manifold 39 to the intake manifold 29, having a flow control valve referred to as an exhaust gas recirculation (EGR) valve 38. The control module 5 is operative to control mass flow of exhaust gas to the intake manifold 29 by controlling opening of the EGR valve 38 through a control signal 170.

Airflow from the intake manifold 29 into the combustion chamber 16 is controlled by one or more intake valve(s) 20. Exhaust flow out of the combustion chamber 16 is controlled by one or more exhaust valve(s) 18 to the exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift profile (VLC) of the intake valve(s) 20 and variably adjust and control phasing (VCP) of the intake camshaft 21 for each cylinder 15 in response to control signals 160 and 162, respectively, from the control module 5. The exhaust VCP/VLC device 24 preferably includes a controllable mechanism operative to variably switch and control valve lift (VLC) of the exhaust valve(s) 18 and variably adjust and control phasing (VCP) of the exhaust camshaft 23 for each cylinder 15 in response to control signals 164 and 166, respectively, from the control module 5.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps occur as a cam lobe transition and preferably include a low-lift valve profile (about 4-6 mm peak lift in one embodiment) preferably for low speed, low load operation, and a high-lift valve profile (about 8-13 mm peak lift in one embodiment) preferably for high speed, high load operation. The intake and exhaust VCP/VLC devices 22 and 24 each preferably includes a variable cam phasing (VCP) mechanism to control and adjust camshaft phasing (i.e., relative timing) and hence the opening and closing timing or phasing of the intake valve(s) 20 and the exhaust valve(s) 18 vis-à-vis the effective low lift of high-lift valve profile. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 has a fuel injection system, including a plurality of high-pressure fuel injectors 28 each configured to directly inject a mass of fuel into one of the combustion chambers 16 in response to a control signal 180 from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a control signal 175 from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 has a sensor device operative to monitor a combustion parameter and is depicted as a cylinder pressure sensor operative to monitor in-cylinder combustion pressure. The output of the combustion sensor 30 and the crank sensor 42 are monitored by the control module 5 to determine combustion phasing, i.e., timing of combustion pressure relative to the crank angle of the crankshaft 12 for each cylinder 15 for each combustion cycle. However, combustion phasing may also be determined by similar methods as may be known by those skilled in the art. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine IMEP for each of the engine cylinders 15 during each cylinder firing event. Alternatively, other sensing systems can be used to monitor other combustion parameters within the scope of the disclosure, e.g., ion-sense ignition systems, exhaust gas fractions, and non-intrusive cylinder pressure sensors.

Control module, module, controller, processor and similar terms mean any suitable one or various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors. The control module 5 is configured to receive input signals from an operator (e.g., via an accelerator pedal and a brake pedal) to determine an operator torque request. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and profile. Independent intake and exhaust valve timing can provide varying degrees of negative valve overlap (NVO) and positive valve overlap (PVO), and varying degrees of early and late openings and closings. Independent intake and exhaust valve profile control can provide for selectively setting intake and exhaust valve lifts (e.g. high-lift or low-lift). The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation in the HCCI combustion mode, the throttle valve 34 is preferably substantially wide-open, with the engine 10 controlled at a lean or stoichiometric air/fuel ratio. The intake and exhaust valves 20 and 18 are operated with the low-lift valve profiles and the camshafts phase controlled to operate at a NVO phase setting. Combustion phasing can be further controlled by fuel injection timing and spark timing. Substantially wide-open throttle can include operating fully un-throttled, or slightly throttled to create a vacuum in the intake manifold 29 to effect EGR flow. EGR flow controls the amount of oxygen available in the airstream. In one embodiment, in-cylinder EGR mass is controlled to a high dilution rate, e.g., greater than 40% of cylinder air charge. One or more fuel injection events can be executed during an engine cycle including at least one injection during a compression phase.

During engine operation in the SI combustion mode, the throttle valve 34 is controlled to regulate the manifold air pressure. The EGR valve 38 is controlled to regulate the amount of oxygen in the airstream. The engine 10 is controlled to a stoichiometric air/fuel ratio, and the intake and exhaust valves 20 and 18 operated with the high-lift valve profiles and the camshaft phase controlled to operate at a PVO phase setting. Late intake valve closing (LIVC) can be utilized wherein LIVC is employed with high intake manifold pressure. LIVC as the term is used herein is understood to correspond to an intake valve timing or phasing that is retarded with respect to a nominal intake valve timing or phasing, for example 20 crank angle degrees after nominal A nominal intake valve timing or phasing as the term is used herein is understood to correspond to a conventional SI combustion mode intake valve opening before TDC, for example 20 crank angle degrees before TDC. Combustion phasing can be controlled by spark timing. The intake airflow is controlled primarily by intake cam phasing. Preferably, a fuel injection event is executed during compression phase of an engine cycle, preferably substantially before TDC. Spark-ignition is preferably discharged at a predetermined time subsequent to the fuel injection when air charge within the cylinder is substantially homogeneous.

The control module 5 transitions engine operation to the preferred combustion mode associated with the engine 10 to increase fuel efficiencies and engine stability, and/or decrease emissions. A change in one of the engine parameters, e.g., speed and load, can effect a change in an engine operating zone. The control module 5 commands a change in the preferred combustion mode associated with a change in the engine operating zone.

During combustion mode transitions, the engine 10 is controlled to operate at a preferred air/fuel ratio and the intake airflow is controlled to achieve the preferred air/fuel ratio. This includes estimating a cylinder air charge based upon engine operation in the selected combustion mode. An exemplary preferred air/fuel ratio can be a stoichiometric air/fuel ratio. The throttle valve 34 and intake and exhaust VCP/VLC devices 22, 24 are controlled to achieve an intake air flowrate based upon the estimated cylinder air charge, including during a transition between the SI and HCCI combustion modes. Airflow is controlled by adjusting the throttle valve 34 and the intake and exhaust VCP/VLC devices 22 and 24 to control the timing (phase) and profiles (lift) of the intake and exhaust valve(s) 20 and 18. Operations in the two combustion modes requires different settings for the intake and exhaust VCP/VLC devices 22 and 24 in terms of valve timing and profiles of the intake and exhaust valve(s) 20 and 18 and the throttle valve 34 for throttle position.

The control module 5 utilizes a plurality of desired settings for engine parameters as inputs to control actuators effecting changes to the engine parameters. Exemplary desired engine parameters include: desired intake oxygen (O2), desired air/fuel ratio (AFR), fuel mass, intake manifold air pressure (MAP), combustion phasing (CA50), and intake air flow (MAF). The control of the desired O2 occurs by controlling the EGR valve 38 position, which variably dilutes the intake airflow. If the EGR valve 38 becomes more open, more EGR gas is able to enter the intake airflow restricting the amount of O2 available for combustion.

The desired AFR is controlled by modifying the airflow (MAF) which is controlled by adjusting valve timing that can be operated in NVO for HCCI combustion and LIVC for SI combustion. By maintaining the intake valve 20 in the open position for longer periods of time during the intake stroke, more air is available for the combustion charge. A fuel mass parameter may then be determined to achieve the desired AFR. The desired MAP is controlled by operating the throttle valve 34. Opening the throttle valve 34 increases the amount of air pressure within the intake manifold, wherein wide open throttle (WOT) is the most open position. Reducing the opening of the throttle valve 34 decreases the intake manifold pressure. The desired CA50 is controlled through injection timing and spark timing when in HCCI combustion mode and is controlled through spark timing when in SI combustion mode. Control of CA50 allows for a proper engine load to be achieved based on current operating conditions.

Certain engine actuators are known to have a fast dynamic response (known as fast engine actuators), and can adjust to a new commanded output within a single engine cycle or cylinder event. The fast engine actuators include, e.g., the fuel injectors 28, the spark-ignition system that provides ignition energy to the spark plug 26, and the VLC portion of the intake and exhaust VCP/VLC devices 22, 24. Other engine actuators are relatively slower in effecting a change in engine operation in response to a control signal (known as slow engine actuators), and take multiple engine cycles or cylinder events to adjust to a new commanded output due to component inertias, mechanical response times, and airflow lags. The slow engine actuators include, e.g., EGR valve position, throttle position, and valve phasing as controlled by the VCP portion of the VCP/VLC devices 22, 24.

Figure 2:
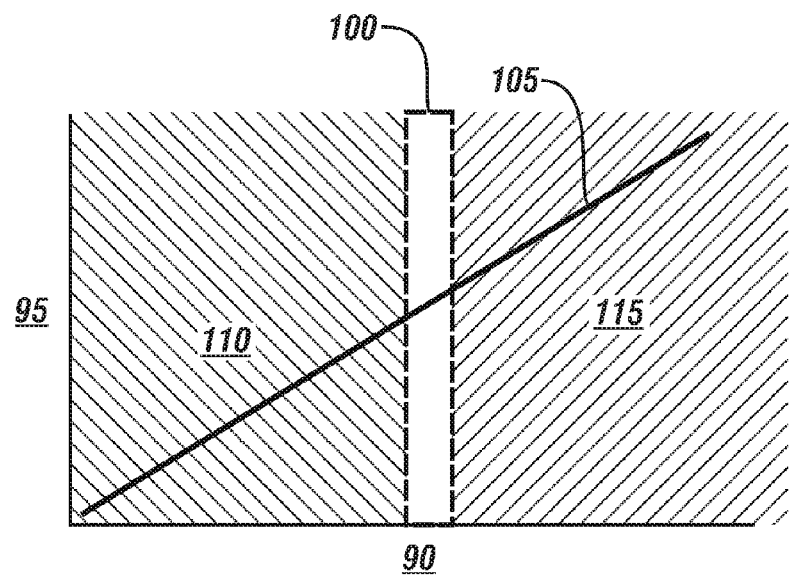
FIG. 2 is a graphical depiction of the relationship between engine load and intake cam position indicating a target switching load for switching between HCCI and SI combustion modes, in accordance with the present disclosure.

FIG. 2 is a graphical representation of an exemplary relationship between engine load 90 (increasing to the right) and intake cam position 95 (advancing toward the top), indicating a target switching window 100 for switching between HCCI and SI combustion modes. An intake cam position line 105 indicates the intake cam position 95 is advanced with increasing engine load 90. The target switching window 100 divides an HCCI combustion mode domain 110 and an SI combustion mode domain 115. The primary engine operating parameters that are controlled in both HCCI combustion and SI combustion modes are AFR, CA50, MAP, and O2. The AFR responds to the MAF that is controlled by the valve timing for both combustion modes. The target switching window 100 is a predetermined range of engine loads wherein the slow engine actuators have similar settings in both the HCCI and SI combustion modes. It will be recognized that the target switching window 100 can be determined by the control module 5 when all or part of the slow engine actuators have similar settings in both the HCCI and SI combustion modes.

When the engine 10 is being operated in the HCCI combustion mode, NVO may be commanded. As the engine load increases, NVO reduces through advancing intake valve timing and preferably symmetrically retarding exhaust valve timing. In SI combustion mode, the LIVC strategy advances intake valve timing with increasing load. Since both the NVO and LIVC strategies utilize similar settings with regard to the slow engine actuators, a window of similar actuator control settings (identified by the target switching window 100) exists for the two combustion modes. In other words, the low-lift valve profiles and the high-lift valve profiles within a region of engine loads provide intake airflows in the corresponding HCCI and SI combustion modes, respectively, conducive to stable combustion maintainable exclusively through fuel and spark control. Stable combustion may be determined for example through an acceptable coefficient of variation (COV) of IMEP, for example a COV of IMEP 5% or lower. One having ordinary skill in the art may determine the camshaft phase relationships or alignment of the high-lift and low-lift valve profiles to provide acceptable combustion stability and engine load region correspondence preferable for HCCI and SI combustion mode transitions. A cam lobe transition (i.e between high-lift and low-lift profiles) may be performed by the VLC portion of the intake and exhaust VCP/VLC devices 22, 24 with the static alignment of low-lift and high-lift cam lobes. Since operation is similar with regard to the slow engine actuator responses, the transition between HCCI and SI combustion modes can occur without having to adjust the slow engine actuators or with minimal adjustment thereof Switching between the combustion modes can therefore be completed in a single engine cycle or cylinder event simply through the fast engine actuators including variable lift control, fuel control and spark control.

Likewise, when the engine is operating in SI combustion using a LIVC strategy, the target switching window 100 may be identified. Once the target switching window 100 has been reached, a cam lobe transition can be performed by the VLC portion of the intake and exhaust VCP/VLC devices 22, 24 with the appropriate alignment of low lift and high lift cam lobes. Since operation is similar with regard to slow engine actuator response, the transition between HCCI and SI combustion modes can occur without having to adjust the slow engine actuators or with minimal adjustment thereof The control to switch the combustion modes is therefore completed in a single engine cycle or cylinder event and permits transition between the combustion modes in a single cycle.

Figure 3:
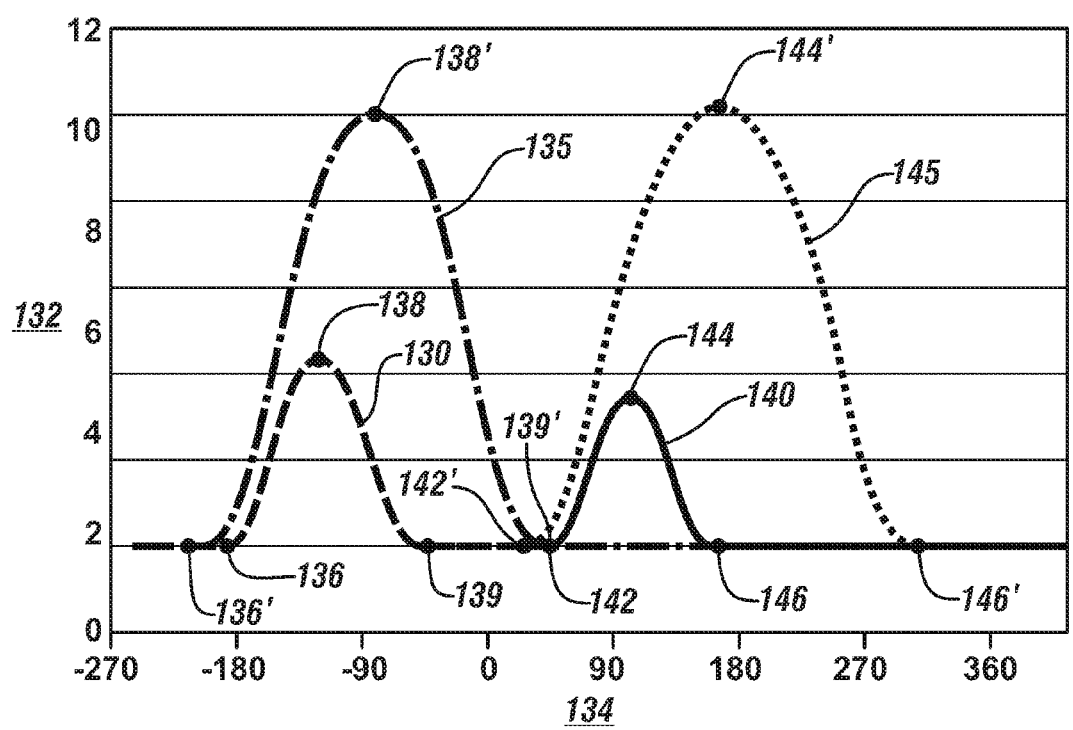
FIG. 3 is a graphical depiction of valve lift with respect to crank angle degrees for exemplary low-lift and high-lift cam lobe profiles, in accordance with the present disclosure.

FIG. 3 depicts valve lift (mm) 132 with respect to crank angle degrees (CAD) 134 for exemplary low-lift and high-lift cam lobe profiles. The exemplary low-lift and high-lift cam lobe profiles include exhaust cam profile in low-lift and high-lift profiles, 130 and 135 respectively, and intake cam profiles in low-lift and high-lift profiles, 140 and 145 respectively. The exhaust cam profile in the low-lift mode 130 begins opening at point 136, reaches maximum lift at point 138, and completely closes at point 139. The exhaust cam profile in the high-lift mode 135 begins opening at point 136', reaches maximum lift at point 138', and completely closes at point 139'. The intake cam profile in the low-lift cam profile 140 begins opening at point 142, reaches maximum lift at point 144, and completely closes at point 146. The intake cam profile in the high-lift cam profile 145 begins opening at point 142', reaches maximum lift at point 144', and completely closes at 146'. It is appreciated that the exemplary cam profiles are one of many combinations capable of being utilized and is not meant to be inclusive of the potential cam profile combinations.

Figure 4:
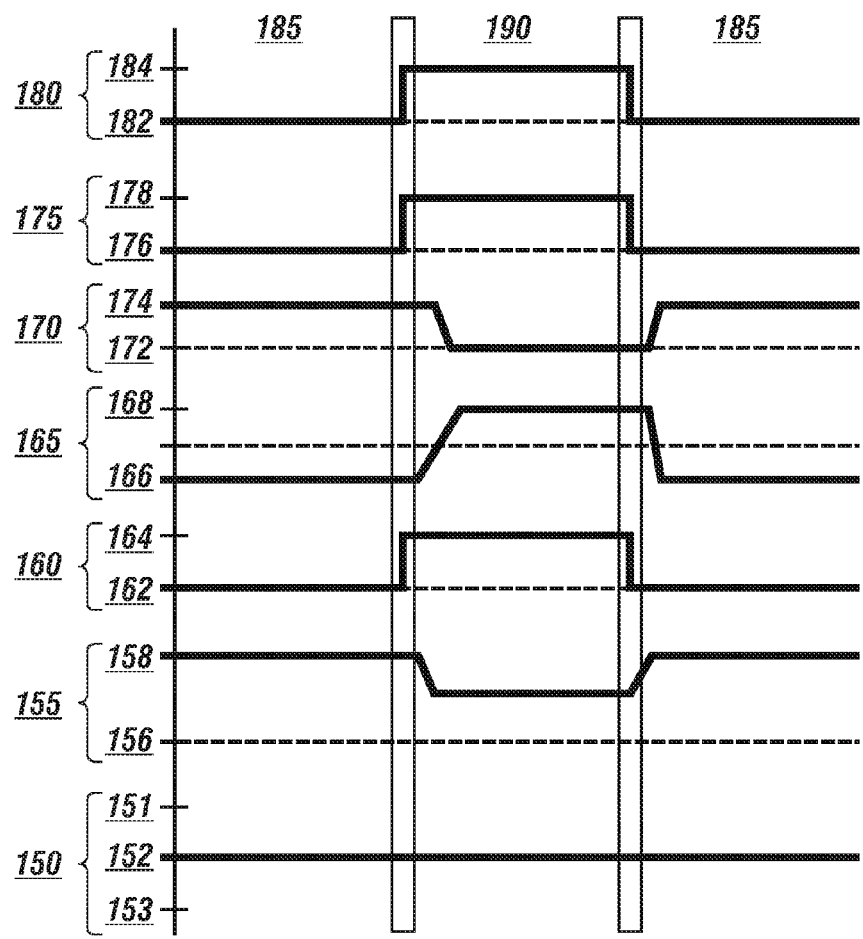
FIG. 4 is a graphical depiction of engine parameters during ongoing engine operation including transitioning between HCCI and SI combustion modes, in accordance with the present disclosure.

FIG. 4 graphically depicts settings of engine parameters during ongoing engine operation including transitioning between HCCI combustion mode 185 and SI combustion mode 190. The engine parameters include AFR 150 with lean operation 151, stoichiometric operation 152, rich operation 153, throttle position 155 varying between fully closed 156 to WOT 158, valve lift profile 160 at one of low-lift profile 162 and high-lift profile 164, cam phasing (VCP) 165 with NVO 166 to PVO 168, EGR control 170 as operated in SI combustion 172 and HCCI combustion 174, spark timing 175 as operated at one of SI combustion 176 and HCCI combustion 178, and fuel injection timing 180 as operated at one of SI combustion mode setting 182 and HCCI combustion mode setting 184.

The engine 10 is initially operating in the HCCI combustion mode 185. During the HCCI combustion mode 185, the control module 5 determines the engine operating conditions indicate the HCCI to SI target switching window 195 has been reached. The control module 5 commands a change in the combustion mode during the HCCI to SI target switching window 195. The fast engine actuators, i.e., the fuel injectors 28, the spark-ignition system, and the VLC portion of the intake and exhaust VCP/VLC devices 22, 24, switch to control settings of injection timing 180, spark timing 175, and valve lift profile 160 associated with the SI combustion mode coincident with the commanded change. This includes the intake and exhaust VCP/VLC devices 22, 24 switching the intake and exhaust valves 20, 18 from the low-lift valve profile 162 to high-lift valve profile 164. The fuel injection timing 180 and associated spark timing 175 adjust to settings corresponding to the SI combustion mode, 184 and 178 respectively, coincident with the change in valve lift profile 160. It will be appreciated that the switching the intake and exhaust valves 20, 18 from the low-lift valve profile 162 to high-lift valve profile 164 will increase intake airflow. In order to maintain the exemplary stoichiometric air/fuel ratio at the switching, the SI combustion mode setting 184 for fueling the engine corresponds to an increased fuel mass. The increased fuel mass requires a SI combustion mode setting 178 for spark timing effective to maintain stable engine load across the switching and with the increased fuel mass. Preferably the SI combustion mode setting 178 at transition is advanced (relative to a mean best torque (MBT) SI setting) to advance combustion phasing sufficiently to maintain engine load continuity across the switching of the intake and exhaust valve profiles. Once the fast engine actuators have transitioned, the control module 5 controls the engine 10 in the SI combustion mode. The transition of the fast engine actuators preferably occurs within one engine cycle. During the transition, the slow engine actuators, i.e., EGR valve position 170, cam phasing 165, and throttle position 155, remain at operating settings corresponding to prior operation in the HCCI combustion mode.

Upon completing the transition from the HCCI combustion mode 185 to the SI combustion mode 190 with the fast engine actuators, the control module 5 begins controlling the slow engine actuators to operating settings associated with operation in the SI combustion mode. The control module 5 commands the intake and exhaust VCP/VLC devices 22, 24 to adjust the cam phasing PVO 168 thereby modifying the intake air flow, which may affect AFR depending upon engine fueling and LIVC strategy used. The throttle opening may decrease from WOT 158 to a predetermined angle desirable for operation in the SI combustion mode if the LIVC strategy used does not account for the proper AFR. The EGR 170 switches from the intake oxygen level required for HCCI combustion mode to that desirable for operation in SI combustion mode. Alternatively, the slow engine actuators can be operating in a stoichiometric HCCI combustion mode prior to and after the transition.

During operation of the engine 10 in the SI combustion mode 190, the control module 5 determines the engine operating conditions indicate the SI to HCCI target switching window 200 has been reached. The control module 5 commands a change in combustion mode during the SI to HCCI target switching window 200. The fast engine actuators, i.e., the fuel injectors 28, the spark-ignition system, and the VLC portion of the intake and exhaust VCP/VLC devices 22, 24, switch to control settings of injection timing 180, spark timing 175, and valve lift profile 160 associated with the HCCI combustion mode. The intake and exhaust VCP/VLC systems 22, 24 switch the valve lift profile 160 from the high-lift valve profile 164 to the low-lift valve profile 162. The fuel injection timing 180 and associated spark timing 175 adjust to settings corresponding to HCCI combustion, 182 and 176 respectively, coincident with the change in valve lift. It will be appreciated that the switching the intake and exhaust valves 20, 18 from the high-lift valve profile 164 to low-lift valve profile 162 will decrease intake airflow. In order to maintain the exemplary stoichiometric air/fuel ratio at the switching, the HCCI combustion mode setting 182 for fueling the engine corresponds to a decreased fuel mass. The decreased fuel mass requires a HCCI combustion mode setting 176 for spark timing effective to maintain stable engine load across the switching and with the increased fuel mass. Preferably the SI combustion mode setting 176 at transition provides a combustion phasing sufficiently to maintain engine load continuity across the switching of the intake and exhaust valve profiles where spark is required at all. Once the fast engine actuators have transitioned, the control module 5 operates the engine in the HCCI combustion mode 185. The transition of the fast engine actuators preferably occurs within one engine cycle. During the transition, the slow engine actuators, i.e., those associated with EGR valve opening 170, cam phasing 165, and throttle position 155, are controlled at operating settings associated with prior operation the SI combustion mode 190.

Upon transitioning from the SI combustion mode 190 to the HCCI combustion mode 185 with the fast engine actuators, the control module 5 controls the slow engine actuators to operate with HCCI combustion mode settings. The control module 5 commands the intake and exhaust VCP/VLC systems 22, 24 to adjust cam phasing 165 NVO 166 thereby modifying the AFR depending on engine fueling. If the throttle position 155 is not in WOT 158 due to the prior engine fueling, the throttle position 155 begins to increase from the SI operational angle to WOT 158. The EGR valve position 170 switches from the intake oxygen level required for SI combustion 172 to that desirable for operation in HCCI combustion. Alternatively, the slow engine actuators can be operating in a stoichiometric HCCI combustion mode prior to and after the transition.

Figure 5:
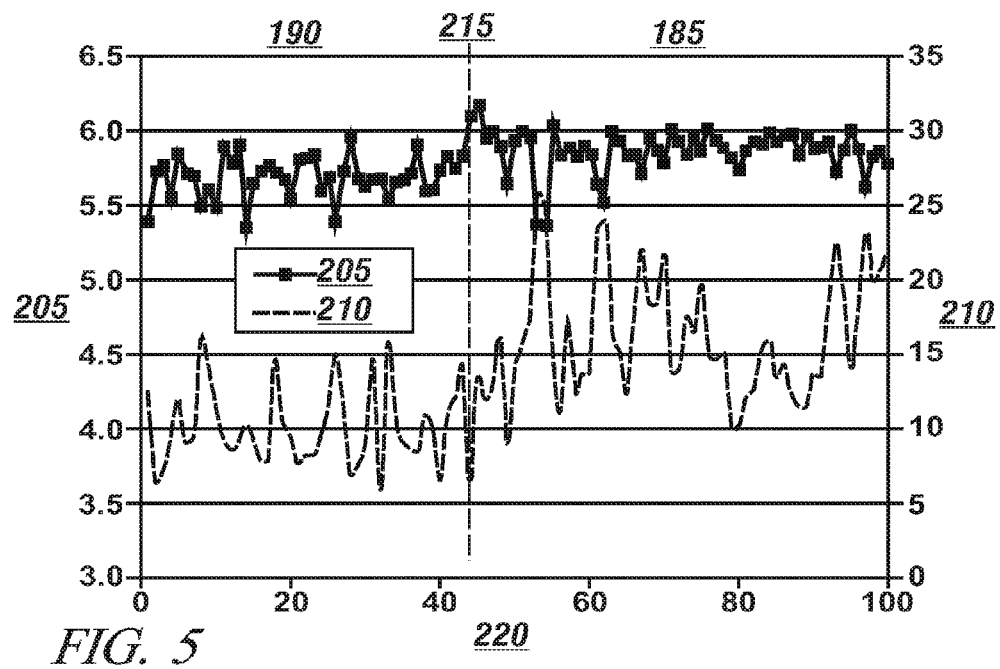
FIG. 5 is a graphical depiction of an exemplary engine transitioning from the SI combustion mode to the HCCI combustion mode depicting engine load and combustion phasing over a specified number of cycles, in accordance with the present disclosure.

FIG. 5 is a graphical depiction of operation of an exemplary engine transitioning from the SI combustion mode 190 to the HCCI combustion mode 185 utilizing only the fast engine actuators of the control scheme represented herein depicting engine load in NMEP 205 and combustion phasing in CA50 210 over a number of cycles 220. The exemplary graph is taken during engine operation at approximately 1000 RPM, stoichiometric AFR, and end of injection of approximately 260 degrees before top dead center (bTDC). The engine 10 operates in the SI combustion mode 190 and transitions to the HCCI combustion mode 185 at line 215. The combustion phasing occurs within a band of operation expected from SI control. The engine load is also within an acceptable band of operation. The fast engine actuators associated with valve lift profile 160 and spark timing 175 are modified to operating settings associated with operating in the HCCI combustion mode 185. The slow engine actuators associated with EGR 170, cam phasing 165, and throttle position 155 remain unchanged. To the right of line 215 shows operation of the HCCI combustion mode 185 with the engine actuators controlled as discussed above. The CA50 210 is more varied than during the SI combustion mode 190 operation. However, the engine load, as represented by NMEP 205 is controlled within a narrower band. Therefore, the engine 10 is capable of being controlled in both SI mode 190 and HCCI mode 185 by operating only the fast engine actuators.

Alternative embodiments may include other internal combustion engines having controllable multi-step valve opening control, including those employing multi-step valve openings and/or variable cam phasing for only the intake valves or the exhaust valves.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method of operating a direct-injection internal combustion engine including an intake camshaft with a low-lift intake cam and a high-lift intake cam, a variable lift control for selectively operating an intake valve in one of a low-lift intake valve profile with the low-lift intake cam and a high-lift intake valve profile with the high-lift intake cam, a variable cam phase control operative on the intake camshaft for simultaneously controlling the phase of the low-lift intake cam and the high-lift intake cam, an ignition spark control, a fuel injection control, an exhaust gas recirculation control, and an intake throttle control, said method comprising:

initially operating the engine in one of
      a) a homogeneous-charge compression-ignition (HCCI) combustion mode including the low-lift intake valve profile, and
      b) a spark ignition (SI) combustion mode including the high-lift intake valve profile;
   in response to achieving a predetermined load point and a predetermined camshaft phasing point within a predetermined range of engine loads wherein the camshaft phasing is such that combustion would be stable during a transition between combustion modes without requiring adjustment to the camshaft phasing, during the normal operation of the engine in the initial one of the HCCI combustion mode and the SI combustion mode, commanding a transition to the other one of the HCCI combustion mode and the SI combustion mode, comprising:
      adjusting said variable lift control, said ignition spark control and said fuel injection control during a single engine cycle to effect respective control settings conducive to stable combustion in the corresponding commanded combustion mode without adjusting the camshaft phasing from a respective control setting corresponding to the initially operated combustion mode; and
      after the transition to the commanded combustion mode is complete, adjusting the camshaft phasing to effect a respective control setting corresponding to the commanded combustion mode;
   wherein the predetermined engine load point and predetermined camshaft phasing point are conducive to combustion both in the HCCI combustion mode and the SI combustion mode.

2. The method of claim 1 wherein subsequent to said transitioning, adjusting at least one of said variable cam phase control, said exhaust gas recirculation control, said intake throttle control.

3. A method of operating a direct-injection internal combustion engine including an intake camshaft with a low-lift intake cam and a high-lift intake cam, a variable lift control for selectively operating an intake valve in one of a low-lift intake valve profile with the low-lift intake cam and a high-lift intake valve profile with the high-lift intake cam, a variable cam phase control operative on the intake camshaft for simultaneously controlling the phase of the low-lift intake cam and the high-lift intake cam, an ignition spark control, a fuel injection control, an exhaust gas recirculation control, and an intake throttle control, said transition control comprising:

operating the engine in a first combustion mode comprising one of
      a) a homogeneous-charge compression-ignition (HCCI) combustion mode including the low-lift intake valve profile, and
      b) a spark ignition (SI) combustion mode including the high-lift intake valve profile;
   in response to achieving a predetermined load point and a predetermined camshaft phasing point within a predetermined range of engine loads wherein the camshaft phasing is such that combustion would be stable during a transition between combustion modes without requiring adjustment to the camshaft phasing, during the normal operation of the engine in the first combustion mode, commanding a transition from the first combustion mode to a second combustion mode comprising the other one of said HCCI and SI combustion modes, the transition comprising:
      adjusting said variable lift control, said ignition spark control and said fuel injection control during a single engine life cycle to effect respective control settings conducive to stable combustion in the corresponding second combustion mode without adjusting the camshaft phasing from a respective control setting corresponding to the first combustion mode;
      after the transition to the second combustion mode is complete, adjusting the camshaft phasing to effect a respective control setting corresponding to the second combustion mode;
   wherein the predetermined engine load point and predetermined camshaft phasing point are conducive to combustion both in the HCCI combustion mode and the SI combustion mode.

4. The method of claim 3, wherein the first combustion mode comprises the HCCI combustion mode with a variable cam phase control setting at the adjustment to said variable lift control establishing a negative valve overlap of the low-lift valve profiles and the second combustion mode comprises the SI combustion mode with the variable cam phase control setting at the adjustment to said variable lift control establishing a late intake valve opening of the high-lift intake valve profile.

5. The method of claim 4, further comprising increasing fuel mass at the adjustment to said variable lift control and setting spark timing sufficient to maintain engine load continuity across the adjustment to said variable lift control.

6. The method of claim 5, wherein setting spark timing sufficient to maintain engine load continuity across the adjustment to said variable lift control comprises setting spark timing advanced relative to a SI combustion mode mean best torque setting.

7. The method of claim 1, wherein the first combustion mode comprises the SI combustion mode with a variable cam phase control setting at the adjustment to said variable lift control establishing a late intake valve opening of the high-lift intake valve profile and the second combustion mode comprises the HCCI combustion mode with the variable cam phase control setting at the adjustment to said variable lift control establishing a negative valve overlap of the low-lift valve profiles.

8. The method of claim 7, further comprising decreasing fuel mass at the adjustment to said variable lift control and setting spark timing sufficient to maintain engine load continuity across the adjustment to said variable lift control.

9. Apparatus for controlling a direct-injection internal combustion engine, comprising:
   an intake camshaft with a low-lift intake cam and a high-lift intake cam;
   a variable lift control for selectively operating an intake valve in one of a low-lift intake valve profile with the low-lift intake cam and a high-lift intake valve profile with the high-lift intake cam;
a variable cam phase control operative on the intake camshaft for simultaneously controlling the phase of the low-lift intake cam and the high-lift intake cam;
an ignition spark control;
a fuel injection control;
an exhaust gas recirculation control;
an intake throttle control and
a combustion mode transition control
   initially operating the engine in one of
      a) a homogeneous-charge compression-ignition (HCCI) combustion mode including the low-lift intake valve profile, and
      b) a spark ignition (SI) combustion mode including the high-lift intake valve profile;
   in response to achieving a predetermined load point and a predetermined camshaft phasing point within a predetermined range of engine loads wherein the camshaft phasing is such that combustion would be stable during a transition between combustion modes without requiring adjustment to the camshaft phasing, during the normal operation of the engine in the initial one of the HCCI combustion mode and the SI combustion mode, commanding a transition to the other one of the HCCI combustion mode and the SI combustion mode, comprising:
      adjusting said variable lift control, said ignition spark control and said fuel injection control during a single engine cycle to effect respective control settings conducive to stable combustion in the corresponding commanded combustion mode without adjusting the camshaft phasing from a respective control setting corresponding to the initially operated combustion mode; and
      after the transition to the commanded combustion mode is complete, adjusting the camshaft phasing to effect a respective control setting corresponding to the commanded combustion mode;
   wherein the predetermined engine load point and predetermined camshaft phasing point are conducive to combustion both in the HCCI combustion mode and the SI combustion mode.

10. The apparatus of claim 9, wherein commanding the transition to the other one of the HCCI combustion mode and the SI combustion mode comprises transitioning from the HCCI combustion mode to the SI combustion mode, adjustments to said fuel mass comprises increasing fuel mass at the adjustment to said variable lift control, and adjustment to said spark timing is sufficient to maintain engine load continuity across the adjustment to said variable lift control.

11. The apparatus of claim 10, wherein adjustment to said spark timing sufficient to maintain engine load continuity across the adjustment to said variable lift control comprises setting spark timing advanced relative to a SI combustion mode mean best torque setting.

12. The apparatus of claim 9, wherein commanding the transition to the other one of the HCCI combustion mode and the SI combustion mode comprises transitioning from the SI combustion mode to the HCCI combustion mode, adjustments to said fuel mass comprises decreasing fuel mass at the adjustment to said variable lift control, and adjustment to said spark timing is sufficient to maintain engine load continuity across the adjustment to said variable lift control.

* * * * *